United States Patent [19]

Reed

[11] 4,378,888
[45] Apr. 5, 1983

[54] UMBRELLA SUPPORT FOR USE IN VEHICLES

[76] Inventor: Judson D. Reed, 9110 Wire Ave., Silver Spring, Md. 20901

[21] Appl. No.: 170,002

[22] Filed: Jul. 18, 1980

[51] Int. Cl.³ ............................................. A47G 25/12
[52] U.S. Cl. ....................................... 211/63; 211/62; 224/273; 224/915; 33/174 G; 296/37.13
[58] Field of Search ............... 224/273, 42.45 R, 915; 211/62, 63; 296/37.13, 37.8, 37.12, 37.15, 37.16; 33/174 G; 248/DIG. 9; 220/DIG. 6, 1 C

[56] References Cited

U.S. PATENT DOCUMENTS

| | | | |
|---|---|---|---|
| 434,304 | 8/1890 | Strong | 224/915 |
| 640,280 | 1/1900 | Doerr | 224/915 |
| 704,750 | 7/1902 | Lesley | 220/1 C |
| 732,022 | 6/1903 | Young | 224/915 |
| 1,665,590 | 4/1928 | Hirtz et al. | 211/63 |
| 1,955,436 | 4/1934 | Mott | 224/915 |
| 2,426,113 | 8/1947 | Northcutt | 296/37.13 |
| 3,081,126 | 3/1963 | Theberge | 296/37.13 |
| 3,124,287 | 3/1964 | Belzer | 224/915 |
| 3,273,769 | 9/1966 | Miller | 211/63 |
| 4,052,099 | 10/1977 | Lowery et al. | 248/DIG. 9 |
| 4,079,838 | 3/1978 | Granum | 248/DIG. 9 |

FOREIGN PATENT DOCUMENTS

| | | | |
|---|---|---|---|
| 644213 | 9/1962 | Italy | 211/62 |
| 36250 | 8/1962 | Switzerland . | |
| 14914 | of 1894 | United Kingdom | 211/63 |
| 1133686 | 11/1968 | United Kingdom . | |

Primary Examiner—William Price
Assistant Examiner—Gary E. Elkins
Attorney, Agent, or Firm—Donald A. Kettlestrings

[57] ABSTRACT

An improved umbrella support for use in vehicles and especially adapted for receiving folding umbrellas wherein the support includes a mounting plate and a trough member projecting from the mounting plate and extending substantially diagonally across the mounting plate for receiving a folded umbrella. A back side of the mounting plate defines indicia or a template for simplifying installation of the support in various types of vehicles.

17 Claims, 5 Drawing Figures

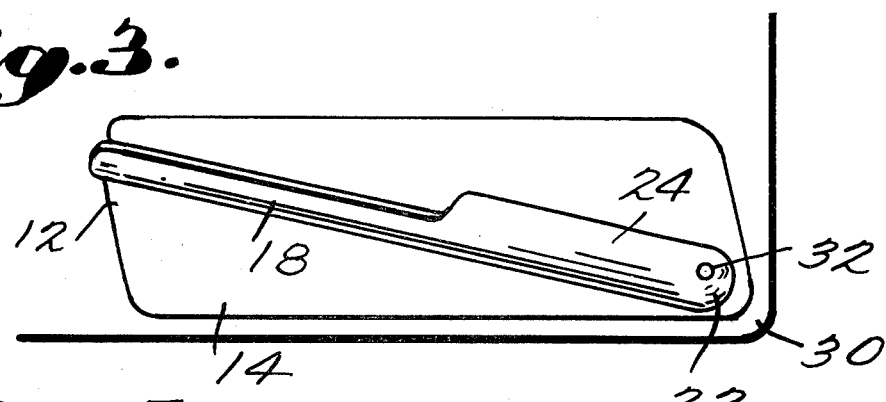
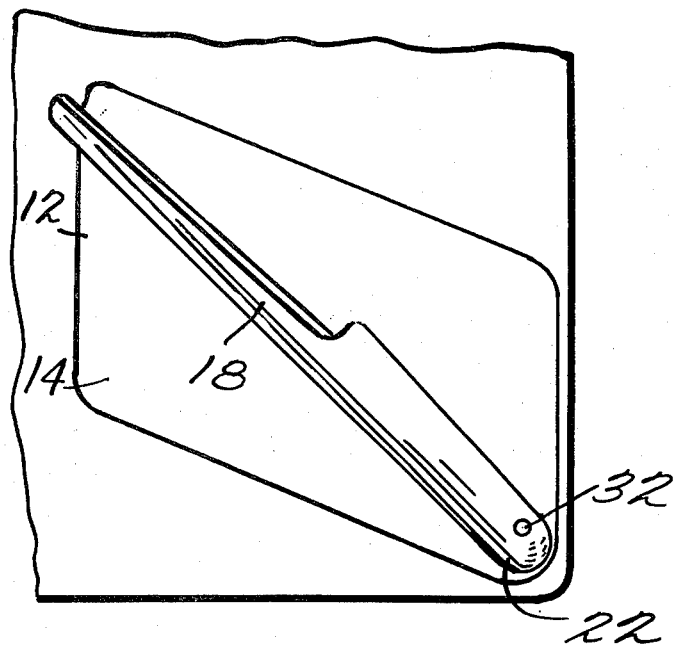
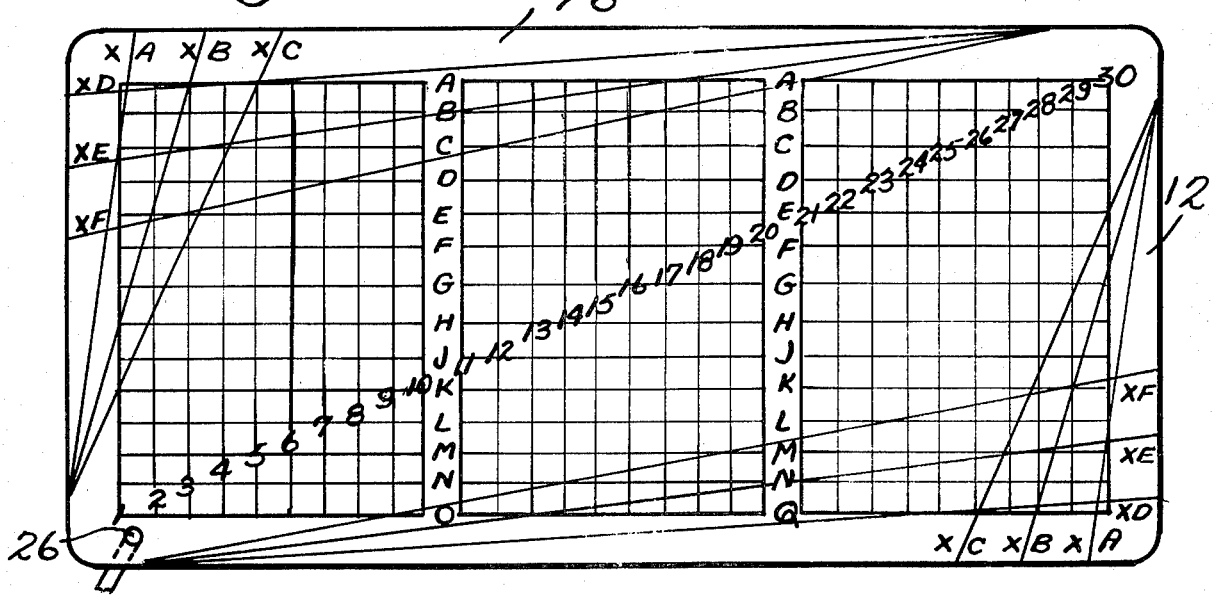

UMBRELLA SUPPORT FOR USE IN VEHICLES

This invention relates to an improved umbrella support for use in vehicles and more particularly to such a support which provides for drainage of water to the interior cavity of a vehicle door and which also is provided with a built-in template for simplifying installation of the support on doors of various types of standardized vehicles.

Various types of umbrella holders or supports for use with vehicles have been developed throughout the years. Although such supports have served the purpose, they have not proved entirely satisfactory under all conditions of service because many of the devices have not provided for drainage of water from wet umbrellas to areas outside of the vehicle. Furthermore, considerable difficulty has been experienced in mounting existing umbrella supports onto vehicle doors without encountering access holes, cutouts, indentations, fasteners securing window tracks and actuating mechanisms, and other assorted nuts and bolts.

It is, therefore, an object the present invention to provide an improved umbrella support for use in vehicles and which is especially adapted for receiving modern, folding umbrellas that are provided with telescoping center shafts.

Another object is to provide an umbrella support for use in vehicles which enables drainage of water from a wet umbrella through a drain hole in the support to an interior cavity of the vehicle door.

A further object of the invention is the provision of an improved umbrella support for use in vehicles wherein the support is provided with a built-in template for simplifying installation of the support onto standardized vehicle doors.

Still another object is to provide an umbrella support for use in vehicles wherein the support can be readily altered in size and shape to permit its installation within various confined spaces.

Yet another object of the present invention is the provision of an improved umbrella support for use in vehicles, which support includes interior longitudinal grooves to facilitate drainage of water from the support.

A still further object of the invention is to provide an improved umbrella support for use in vehicles, which support defines a cleaning aperture positioned for enabling cleaning and removal of debris from the drain hole of the support.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides an improved umbrella support comprising a mounting plate defining first and second substantially planar and parallel sides, a trough member projecting from a first side of the mounting plate for receiving a folded umbrella, the trough member enclosed at and adjacent to a first end thereof to form a tubular receptacle for the umbrella, and the tubular receptacle defining a drain hole in fluid communication between the first and second sides of the mounting plate for enabling water to drain from the receptacle.

In accordance with the invention, the umbrella support further includes a flexible tube attached to the mounting plate and in fluid communication with the drain hole for enabling water to drain from the support to an interior cavity of the vehicle door.

The tubular receptacle further defines a cleaning aperture positioned substantially diametrically opposite to the drain hole, and the mounting plate is substantially rectangular in shape with the trough member extending substantially diagonally across the mounting plate.

Preferably, the trough member defines the tubular receptacle substantially along one-half the length of the trough member, and the trough member and tubular receptacle are preferably integral with respect to the mounting plate.

In accordance with the invention, the second side of the mounting plate defines indicia or a template for simplifying installation of the support for various types of vehicles.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention, and, together with the description, serve to explain the principles of the invention.

FIG. 3 is a side elevation view of the support with portions of the mounting plate removed;

FIG. 4 is a side elevation view of the support with different portions of the mounting plate removed; and FIG. 5 is a rear elevation view of the support illustrating the indicia or template located on the rear or back side of the mounting plate.

Figure 1:
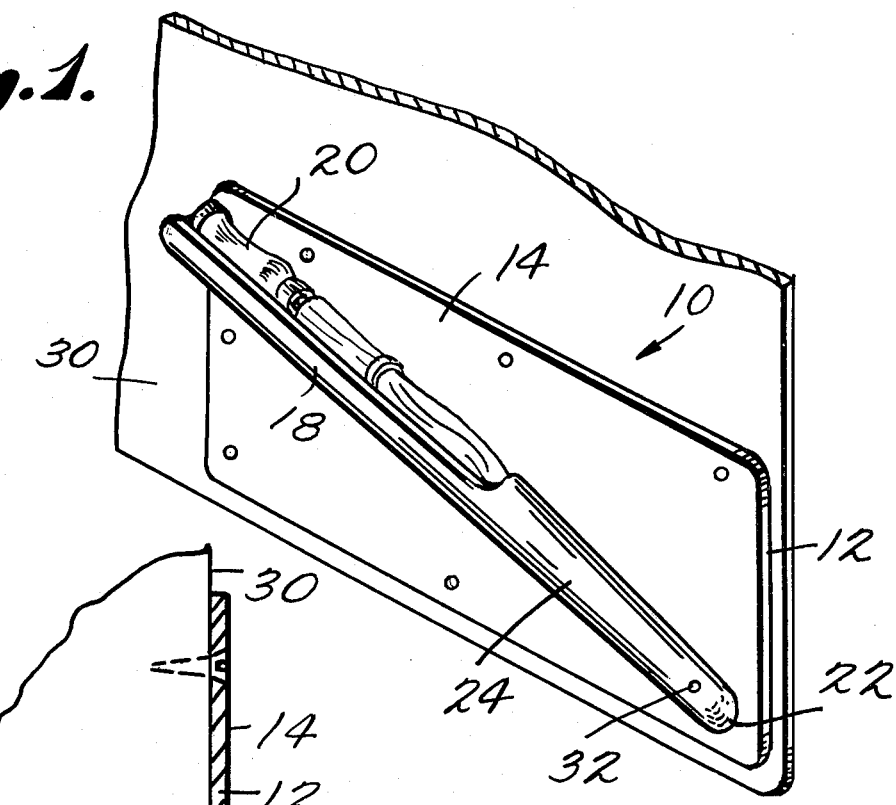
FIG. 1 is a perspective view of the umbrella support mounted on the front portion and on the inside surface of a vehicle door.
Figure 2:
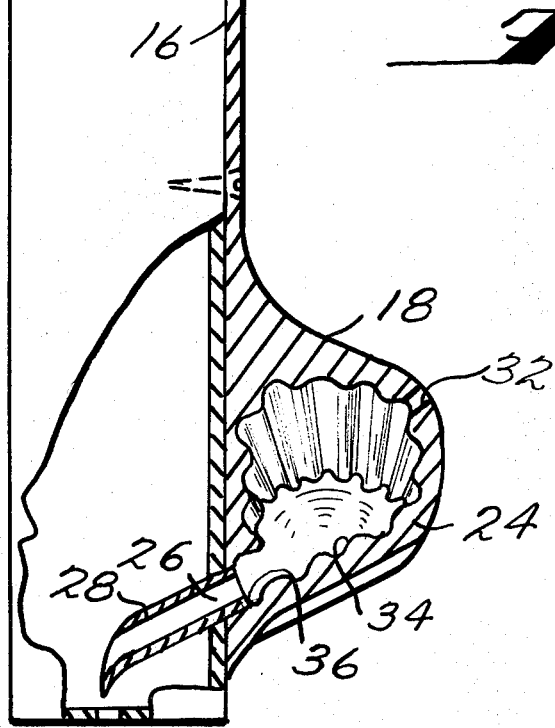
FIG. 2 is a cross-sectional view of the support taken along the line 2—2 in FIG. 1 and looking in the direction of the arrows.

With reference now to the drawings, wherein like reference characters designate like or corresponding parts throughout the several views, there is shown an umbrella support 10 including a mounting plate 12 defining first and second substantially planar and parallel sides 14, 16. A trough member 18 projects from side 14 of the mounting plate for receiving a folded umbrella 20. Trough member 18 is enclosed at a first end 22 thereof, and the trough member is also enclosed adjacent to end 22 and substantially along one-half the length of the trough member to form tubular receptacle 24 for the umbrella.

The tubular receptacle 24 defines a drain hole 26 in fluid communication between sides 14, 16 of mounting plate 12, and the drain hole is positioned at end 22 for enabling water to drain from receptacle 24. A flexible, hollow tube 28 is attached to mounting plate 12 and in fluid communication with drain hole 26 for enabling water to drain from the interior of receptacle 24 to the interior cavity of the vehicle door 30 upon which support 10 is mounted.

Tubular receptacle 24 further defines a cleaning aperture 32 positioned substantially diametrically opposite to drain hole 26. The cleaning aperture permits use of a pipe cleaner or similar cleaning implement to clear drain hole 26 and tube 28 of lint and other debris.

Mounting plate 12 is preferably substantially rectangular in shape with rounded corners, and trough member 18 preferably extends substantially diagonally across the mounting plate. Trough member 18 and tubular receptacle 24 are preferably integral with respect to mounting plate 12, although it should be understood that the trough member and the tubular receptacle could be separately formed and mounted or attached to the mounting plate in a conventional manner.

To facilitate drainage of water from the wet umbrella toward enclosed end 22 and out through drain hole 26 and tube 28, interior surfaces 34 of trough member 18 and of tubular receptacle 24 are longitudinally grooved. A particularly deep groove 36 is preferably located along surface 34 and immediately adjacent to mounting plate 12. Groove 36 extends the combined length of trough member 18 and receptacle 24, and groove 36 ends at drain hole 26 so that water is collected within the groove and channeled out through the drain hole.

Trough member 18 and receptacle 24 must be large enough to accommodate a man's folding umbrella in its carrying case. The trough member and tubular receptacle must also contain a smaller, woman's model folding umbrella in such a way that the umbrella will not be thrown or jolted out of the trough member and the receptacle when the car door is slammed. The preferred combined length for trough member 18 and receptacle 24 is from fifteen to sixteen inches and about two inches in diameter. Support 10 should hold an umbrella at a steep enough angle to ensure drainage of water from drain hole 26, yet not be so high as to interfere with door handles, window cranks and arm rests. The support should project from the vehicle door no more than necessary so as to minimize interference with the foot corridor (space for feet of person entering or leaving the vehicle). The support should project from the door no more than a maximum of approximately two inches to provide sufficient room for the foot corridor and to prevent interference with vehicle seat operation.

Rectangular mounting plate 12 is preferably approximately eight inches high, sixteen inches long, and one-eighth inch to three-sixteenths inch thick. These dimensions provide a sufficient angle for trough member 18 and for tubular receptacle 24 when support 10 is mounted on the vehicle door to ensure drainage of water from drain hole 26. The corners of mounting plate 12 are rounded to avoid snagging of clothing or umbrella fabric.

Actual support of umbrella 20 is provided by the combination trough member 18 and receptacle 24, and end 22 of the trough member is preferably rounded to avoid snagging on clothing. The open portion of trough member 18 at the upper end thereof is approximately half-round in shape, and this open portion of trough member 18 enables the user to easily insert the umbrella into and remove the umbrella from combined trough member 18 and tubular receptacle 24.

Another important feature of this invention is the provision of indicia on second or back side 16 of mounting plate 12 for simplifying installation of support 10 in various types of vehicles. The indicia illustrated in FIG. 5 include indicia which act as guides for cutting and removing portions of mounting plate 12 whereby installation of support 10 on various types of vehicles and within various sizes and shapes of confined spaces can be accomplished. The indicia may be formed by grooves in back side 16, or the indicia may simply be lines imprinted thereon.

Among the indicia is preferably included a main grid of lines spaced from the edges of mounting plate 12 and formed by a first plurality of parallel lines (identified in FIG. 5 by letters A through O, with I omitted) intersected at substantially right angles by a second plurality of parallel lines (identified in FIG. 5 by numbers 1 through 30) to form a plurality of squares. The first plurality of parallel lines consists of fourteen lines, and the second plurality of parallel lines consists of thirty lines. Of course, it should be understood that the number of lines could be changed without departing from the spirit and purpose of this invention. However, too few lines will not result in the accuracy required in properly positioning holes in the vehicle door for mounting support 10.

Among the indicia are second indicia located adjacent to the edges of mounting plate 12. These second indicia consist of four groups of three lines wherein each of the groups is located adjacent to and substantially coextensive with a respective edge of the mounting plate. In FIG. 5, these second indicia lines are identified by letters XA, XB, XC, XD, XE and XF. The lines in each of the four groups extend from a substantially common point at one edge of mounting plate 12 to three different points at an adjoining edge of the mounting plate.

The main grid of lines serves as a built-in template for locating holes in the vehicle door for mounting screws. The diagonal lines, XA, XB etc. provide guides for cutting mounting plate 12 to allow installation of support 10 in restrictive spaces.

There will preferably be two similar models of the umbrella support of this invention. A left-hand model will be used on the left front or left rear doors of a vehicle, and a right-hand model, an exact opposite or mirror image of the left-hand model, will be used on the right front or right rear doors of a vehicle. Because the left-hand model will undoubtedly be the more popular model, the figures illustrate the left-hand model. However, except for the direction in which the combined trough member 18 and receptacle 24 slopes with respect to mounting plate 12, and the mirror image of the indicia on back side 16, the features of the left-hand model and of the right-hand model are the same.

Installation of umbrella support 10 is best accomplished by use of the built-in template located on back side 16 of mounting plate 12. The configurations of automobile door panels vary considerably from model to model, from front door to back door and sometimes even from car to car within the same model line. For example, certain late model Ford automobiles are equipped with a power operated vent window in the front door while others, lacking this option, have no vent. As a result, the front window tracks in these cars are in different locations. With such wide variations in the arrangements of holes, mounting bolts, trim fasteners and other obstructions, it would be extremely foolish to blindly drill holes through the inside trim panel of the vehicle door in preparation for mounting support 10. This difficulty is solved by means of the built-in template of this invention.

For normal installation in a popular make and model of automobile, correct positioning of support 10 relative to the vehicle door edges and proper locations for mounting screws can be ascertained by the manufacturer or distributor of the support, and appropriate instructions can be furnished to the installer. This could be done, for example, by the use of templates carrying the necessary instructions and showing the locations for mounting screws. Although a single such template might serve for several makes and models of automobiles, scores if not hundreds of different templates would be needed. Preparing and distributing these templates would become a burdensome task. The built-in template of this invention avoids this difficulty.

General installation instructions, applicable to all makes and models of automobiles, can be prepared by the manufacturer or distributor of support 10 in the form of a small booklet, pamphlet or flier. Instructions for a particular installation on a certain door of a specific make and model of automobile can be printed as an entry in a table specifying correct positioning (distances from door edges), necessary trimming (cutting of mounting plate 12 along lines XA, XB, etc.) and location of holes in the door for mounting screws. For example, for the installation illustrated in FIG. 1 using the template of the invention shown in FIG. 5, the following tabular instructions would be specified:

| CLEARANCES | | TRIMMING CUT ON | |
|---|---|---|---|
| FRONT EDGE | BOTTOM EDGE | SCORE LINES | MOUNTING SCREW LOCATIONS |
| FORD LTD 4-DOOR PILLARED HARDTOP, 1973-76 FRONT DOOR, R OR L (WITHOUT VENT WINDOW, WITHOUT STEREO SPEAKER) | | | |
| ½" | ½" | NONE | A1, A10, A25, E30, J1, O14, O30 |

Because the left-hand and the right-hand models of umbrella support 10 are mirror images of each other (including the template indicia), specifications for clearances, trimming and mounting screw locations will almost always be identical for either left or right-hand installation on a given make and model of automobile. Six to eight self-tapping screws are adequate for mounting support 10 onto the interior of vehicle door 30.

After the screw locations have been determined from the tabular instructions and after they have been marked on the template of support 10, they should be center-punched and drilled from back side 16 of mounting plate 12. The drilled holes should then be countersunk from front side 14 of the mounting plate. Support 10 is then held in position on door 30 with back side 16 of the mounting plate contacting the door. The drilled holes in support 10 are then used as a template to mark and punch locations on the interior door panel for the mounting screws. The proper position for drain tube 28 can be marked on the interior of the vehicle door by inserting an awl or thin punch through cleaning aperture 32 so that it extends through drain hole 26 and into contact with the interior surface of vehicle door 30. An appropriate drain hole is then drilled through the interior surface of the vehicle door 30, and when support 10 is mounted, drainage tube 28 is inserted through the drainage hole in door 30.

FIG. 3 illustrates the general appearance of support 10 when trimmed on second indicia lines XF and installed in a vertically restricted space. FIG. 4 shows the appearance of support 10 when trimmed on second indicia lines XC and installed in a horizontally restricted space.

Although mounting of umbrella support 10 as close as possible to the front edge and bottom edge of a car door will probably be the most satisfactory location in most cases, other locations should prove satisfactory in many cases. In fact, other locations may be made necessary by the conformation or features of some car doors (door-mounted stereo speakers, courtesy lights, etc.). Where there is sufficient clearance between the vehicle seat and door, an alternative to the normal mounting position would be to position umbrella support 10 near the back of the vehicle door with enclosed end 22 toward the rear. This would require the mounting of a right-hand model at the back of a left side vehicle door. Another possible alternative would be to mount support 10 on the side of the vehicle transmission hump or console (not shown), probably using a right-hand model of the umbrella support on the left side of the transmission hump or vice versa and with mounting plate 12 trimmed as illustrated in FIG. 3. A drainage hole in that configuration could be drilled through the transmission hump so that water would drain from the support.

The umbrella support of this invention requires very little care to maintain its appearance and functioning. Trough member 18 and receptacle 24 should be vacuum-cleaned occasionally to prevent the accumulation of debris that might clog the drainage hole 26 and tube 28. A pipe cleaner inserted through cleaning aperture 32 and through drainage hole 26 will ensure that drainage tube 28 remains unobstructed. Should tube 28 become badly clogged, it is a simple task to remove support 10 from the vehicle door and to clear the obstruction. Reinstallation of the support onto the door is a simple matter.

Support 10 is preferably a single piece of molded, semi-rigid plastic. General Electric "Lexan" (a trademark) is one example of a suitable plastic material.

The invention in its broader aspects is not limited to the specific details shown and described, and departures may be made from such details without departing from the principles of the invention and without sacrificing its chief advantages.

What is claimed is:

1. An umbrella support for use in vehicles, comprising:
   a mounting plate defining first and second substantially planar and parallel sides;
   a trough member projecting from a first side of said mounting plate for receiving and supporting a folded umbrella;
   said trough member enclosed at and adjacent to a first end thereof to form a tubular receptacle for said umbrella substantially along one-half the length of said trough member;
   said trough member defining an upwardly opening open portion at and adjacent to a second end thereof, said open portion extending substantially along one-half the length of said trough member; and
   said tubular receptacle defining a drain hole in fluid communication between said first and second sides of said mounting plate for enabling water to drain from said receptacle.

2. An umbrella support as in claim 1 further including a flexible hollow tube attached to said mounting plate and in fluid communication with said drain hole.

3. An umbrella support as in claim 2 wherein said tubular receptacle further defines a cleaning aperture positioned substantially diametrically opposite to said drain hole.

4. An umbrella support as in claim 3 wherein said mounting plate is substantially rectangular and wherein said trough member extends substantially diagonally across said mounting plate.

5. An umbrella support as in claim 4 wherein said trough member and said tubular receptacle are integral with respect to said mounting plate.

6. An umbrella support as in claim 5 wherein interior surfaces of said trough member and said tubular receptacle are longitudinally grooved to facilitate drainage of water through said drain hole.

7. An umbrella support as in claim 1 wherein said second side of said mounting plate defines first indicia for simplifying installation of said support in various types of vehicles.

8. An umbrella support as in claim 7 wherein said first indicia include second indicia which act as guides for cutting and removing portions of said mounting plate, whereby installation of said support on various types of vehicles can be accomplished.

9. An umbrella support as in claim 8 wherein said first and second indicia are grooves formed in said second side of said mounting plate.

10. An umbrella support as in claim 8 wherein said first indicia include a grid of lines formed by a first plurality of parallel lines and intersected at substantially right angles by a second plurality of parallel lines to form a plurality of squares.

11. An umbrella support as in claim 10 wherein said first plurality of parallel lines consists of fourteen lines identified by letters and wherein said second plurality of parallel lines consists of thirty lines identified by numbers.

12. An umbrella support as in claim 11 wherein said second indicia are located adjacent to edges of said mounting plate.

13. An umbrella support as in claim 12 wherein said second indicia are four groups of three lines and wherein each of said groups is located adjacent to and substantially coextensive with a respective edge of said mounting plate.

14. An umbrella support as in claim 13 wherein the lines in each of said groups extend from a substantially common point at one edge of said mounting plate to three different points at an adjoining edge of said mounting plate.

15. An umbrella support as in claim 14 wherein each line in each of said groups is identified by letters.

16. An umbrella support as in claim 1 wherein said first enclosed end of said trough member is rounded in shape.

17. An umbrella support as in claim 1, wherein said open portion of said trough member is substantially half-round in shape.

* * * * *